United States Patent [19]
Robin et al.

[11] Patent Number: 4,836,281
[45] Date of Patent: Jun. 6, 1989

[54] PROCESS FOR IMPROVING THE GAS SWEEPING OF AN OIL FORMATION, USING FOAMS MAINLY CONTAINING SURFACTANTS WITH PERFLUORIC GROUPS

[75] Inventors: Michel Robin, Poissy; Claude Demay, Voisins Le Bretonneux, both of France

[73] Assignees: Institut Francais du Petrole, Rueil Malmaison; Atochem, Puteaux, both of France

[21] Appl. No.: 146,159

[22] Filed: Jan. 20, 1988

[30] Foreign Application Priority Data

Jan. 20, 1987 [FR] France ............................ 87 00705

[51] Int. Cl.$^4$ ............................................ E21B 43/22
[52] U.S. Cl. ............................... 166/272; 166/273; 166/274; 166/275; 166/309; 252/8.554
[58] Field of Search ............................ 166/272–275, 166/303, 305.1, 309; 252/8.554

[56] References Cited

U.S. PATENT DOCUMENTS

| | | |
|---|---|---|
| 2,866,507 | 12/1958 | Bond et al. ........................ 166/274 |
| 3,342,256 | 9/1967 | Bernard et al. ..................... 166/273 |
| 3,529,668 | 9/1970 | Bernard ............................. 166/273 |
| 4,086,964 | 5/1978 | Dilgren et al. ..................... 166/272 |
| 4,108,782 | 8/1978 | Thompson ...................... 166/307 X |
| 4,432,882 | 2/1984 | Raynolds et al. ............... 166/308 X |
| 4,440,653 | 4/1984 | Briscoe et al. ............... 166/305.1 X |
| 4,577,688 | 3/1986 | Gassmann et al. ............ 166/309 X |
| 4,693,311 | 9/1987 | Muits et al. ..................... 166/273 X |

Primary Examiner—George A. Suchfield
Attorney, Agent, or Firm—Millen, White & Zelano

[57] ABSTRACT

The invention concerns an enhanced oil recovery process improving the gas sweeping of an oil formation reservoir comprising at least one injection, through at least one injection well, either simultaneously or separately, of a plug of solution, preferably aqueous, of at least one surfactant and of a gas and/or steam plug (or "slug"), so as to form a foam.

At least a portion of said reservoir is swept by said foam and the hydrocarbons are recovered through at least one producing well. The surfactant complies with the general formula $R_F$—Y—X wherein $R_F$ is a perfluoric carbon radical, Y is a single bond or a divalent carbon radical containing at least one oxygen, sulfur and/or nitrogen atom, and X is a hydrophilic group.

18 Claims, 3 Drawing Sheets

PROCESS FOR IMPROVING THE GAS SWEEPING OF AN OIL FORMATION, USING FOAMS MAINLY CONTAINING SURFACTANTS WITH PERFLUORIC GROUPS

BACKGROUND OF THE INVENTION

The present invention concerns an enhanced hydrocarbon recovery process using foams mainly containing at least one surfactant with perfluoric group to improve gas sweeping in enhanced oil recovery.

The prior art is illustrated by the European patent 173176 which discloses the use of perfluoric compounds to control the mobility of water in porous or fractured medium. They are water thickeners acting as viscosity increasing agent for an injected single aqueous phase, but not as foaming agent.

Compounds with perfluoric groups are also known, particularly from U.S. Pat. No. 4,108,782, as giving foams for use alone or as mixture in processes for treating oil wells. They provide, in particular, for an efficient cleaning of sludges and deposits recovered after acid well treatments. Moreover, the compound disclosed in this U.S. patent is a rather poor foaming agent.

The invention is particularly applicable to enhanced oil recovery from a subsurface reservoir wherein, as a result of the low density of the sweeping gas, of its greater mobility and/or of the permeability difference of the strata to be swept, the gas tends to follow preferential paths, particularly at the upper part of the reservoir.

As a matter of fact, in enhanced oil recovery operations, during the gas injection, the oil is satisfactorily moving in zones effectively swept by the gas. Unfortunately, due to its specific gravity, the latter tends to flow preferentially towards the top of the reservoir, particularly when the oil contained therein is viscous. After the injected fluid has reached the one or more producing well(s), the sweeping becomes ineffective in zones where oil is still present.

The same is true for heterogeneous or fractured fields wherein more permeable drains are responsible for the premature gas release, while the oil tends to remain into the less permeable layers.

In order to improve the sweeping rate, it may be considered to block the gas access to zones preferentially flushed by the sweeping fluid, either by gravity or by permeability difference effect.

It is known, particularly from U.S. Pat. No. 4,086,964, to use foams, produced from such foaming surfactants as sulfonates with hydrocarbon chains, which generate with the injected gas, a foam which may travel within the porous medium and block the gas preferential paths.

However, when contacted with a hydrocarbon phase of the field, the hydrocarbon surfactants present in the foams tend to migrate to the oil phase. Their concentration decrease in the film-forming foam results in a mechanical degradation of the latter. The "foam" structure cannot be maintained; it disappears and is replaced by a water+surfactant/oil/gas mixture. Then, these three phases tend to take separate paths within the porous medium. Accordingly, the method becomes quite ineffective.

In order to cope with this disadvantage, searches have been conducted for obtaining products keeping their foaming properties within the field and forming mechanically stable foams in the presence of a hydrocarbon phase.

SUMMARY OF THE INVENTION

This object can be met by the process according to the invention for enhanced recovery of hydrocarbons present in a subsurface reservoir, comprising at least one injection into at least one injection well, either simultaneously or separately, of a plug (or "slug") formed of solution, preferably aqueous, of at least one surfactant and a plug of gas and/or steam so as to form a foam. At least a part of said reservoir is swept by said foam and hydrocarbons are recovered from at least one producing well.

More precisely, the surfactant complies with the following general formula (I):

$$R_F\text{—}Y\text{—}X \qquad (I)$$

wherein $R_F$ is a perfluoric carbon radical,

Y is a single bond or a hydrocarbon divalent radical or a divalent radical containing at least one oxygen, sulfur and/or nitrogen atom, and X is a hydrophilic group, comprising for example a quaternary ammonium, a betaine or a sulfobetaine.

Radical $R_F$ is preferably a perfluoroalkyl radical, linear or branched, containing 1 to 20 carbon atoms, advantageously 4 to 14 carbon atoms, more particularly 6 to 10 carbon atoms.

The hydrocarbon divalent radical preferably comprises an ending carbon adjacent to the perfluoric carbon radical.

Radical Y may optionally comprise a —CF=CH— ending group, the fluoric unsaturated carbon being adjacent to the perfluoric radical, as disclosed in French Pat. No. 2,153,489.

Examples of surfactants with perfluoric groups advantageously used, separately or as mixtures, comprise among the cationic surfactants, those complying with formula (II) below.

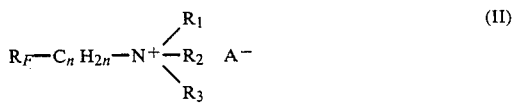

$$R_F\text{—}C_nH_{2n}\text{—}N^+\begin{matrix}R_1\\ R_2\\ R_3\end{matrix}\quad A^- \qquad (II)$$

wherein:

$R_F$ is defined as in the above formula (I), $C_nH_{2n}$—corresponds to radical Y of formula (I) and the remainder of the molecule corresponds to group X, n is an integer from 1 to 12, preferably 2, Each of radicals $R_1$, $R_2$ and $R_3$, identical or different, represents a hydrogen atom or a $C_1$-$C_8$ alkyl (preferably methyl)radical, a $C_5$-$C_{10}$ cycloalkyl radical, a $C_2$-$C_8$ alkenyl radical, a $C_5$-$C_{10}$ cycloalkenyl radical, a hydroxyalkyl radical containing 2 or 3 carbon atoms or an aryl (preferably phenyl) radical, two of these radicals optionally forming together a divalent radical linked to the nitrogen atom by two single bonds (e.g. an aliphatic divalent saturated or unsaturated radical containing 4-9 carbon atoms), or $R_1$, $R_2$ and $R_3$ form together with the nitrogen atom the remainder of an aromatic tertiary amine derived from pyridine and containing 5-18 carbon atoms (preferably pyridine, picolines, quinoline, isoquinoline and acridine).

$A^-$ is an anion, for example of a halide, sulfate, alkylsulfate, phosphate, sulfonate, alkylsulfonate, arylsulfonate, alkanoate or hydroxyl group. Preferred anions are those of halides such as fluoride, chloride, bromide and iodide, sulfates such as $HSO_4^-$, $SO_4^{--}$ and $CH_3SO_4^-$, acetates such as $CH_3-CO_2^-$ and $CF_3-CO_2^-$, the hydroxyl OH and paratoluene sulfonate.

Radical $-C_nH_{2n}-$ according to formula (II) may advantageously consist of a linear alkylene radical $-(CH_2)_n-$.

The compounds of formula (II) and their preparation have been disclosed in the following patents: French Pat. No. 1,588,482, French Pat. No. 2,153,489, French Pat. No. 2,044,070, U.S. Pat. No. 2,727,923, U.S. Pat. No. 3,257,407 and U.S. Pat. No. 3,535,389.

The so-prepared compounds are not always pure and French Pat. No. 2,153,489 discloses for example a mixture of the two following derivatives:

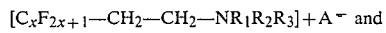

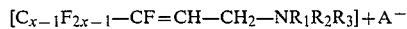

due to the use of unpure amines in the preparation.

Radical Y contains a fluorine atom on the ending carbon adjacent to the perfluoric group $R_F$ having an unsaturation.

Examples of preferred surfactants with perfluoric group are the amphoteric surfactants complying with the following formula (III):

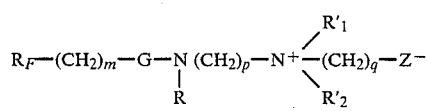

wherein:

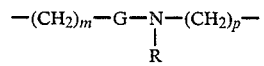

corresponds to radical Y of formula (I) and/or

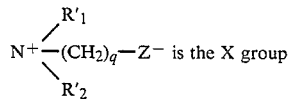

$R_F$ is the perfluoric group defined in formula (I),
m is zero or an integer from 1 to 12, preferably 2,
G is a divalent radical, CO or $SO_2$,
R is hydrogen atom or an alkyl group having 1–4 carbon atoms (methyl, ethyl, propyl, n-butyl and isobutyl),
p is zero or an integer from 1 to 10, preferably 3,
q is an integer from 1 to 20, preferably 1 or 2,
$R'_1$ and $R'_2$, identical or different, are alkyl groups of 1–4 carbon atoms (methyl, ethyl, propyl, n-butyl and isobutyl), preferably methyl, and
Z is a $SO_3^-$ or $COO^-$ groups.

Other examples of surfactants with perfluoric group to be used advantageously are more particularly those complying with formula (IV):

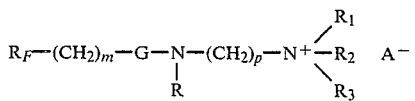

wherein the different symbols have the same meaning as precedingly.

With m preferentially equal to 2 the obtained foam is particularly stable.

The compounds of formulas (III) and (IV) and their preparation have been disclosed in the following patents: French Pat. No. 2,088,699, French Pat. No. 2,088,941, French Pat. No. 2,128,028, French Pat. No. 2,127,287, French Pat. No. 2,390,426, French Pat. No. 2,453,145 and French Pat. No. 2,084,888.

Other examples of surfactants with perfluoric groups to be used advantageously are more particularly those complying with formula (V):

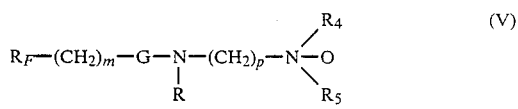

wherein $R_4$ and $R_5$ are alkyl radicals having 1–6 carbon atoms, preferably methyl radical, and wherein the different symbols have the same meaning as precedingly.

Compounds of formula (V) and their manufacture have been disclosed in French Pat. Nos. 2,035,589 and 2,477,144.

Advantageously, as surfactants with perfluoric groups, the perfluoric telomers with hydrophilic group (VI), as described in European Pat. No. 189,698, can be used. They comply with the general formula:

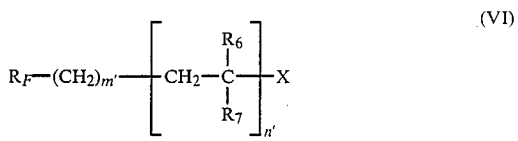

wherein $R_F$ is as above defined,
X is a iodine, chlorine or bromine atom,
m' is zero, 1 or 2,
n' is a number from 5 to 1000,
$R_6$ is a hydrogen atom or a methyl radical,
$R_7$ is a $-COOH$ or $-CONR_8R_9$ group, the symbols $R_8$ and $R_9$, identical or different, being each a hydrogen atom or an alkyl or hydroxyalkyl radical.

The compounds of formulas (I), (II), (III), (IV), (V) and (VI) have a water/oil distribution coefficient substantially lower than that of the same molecule without fluorine substitution.

One advantage of using the foam according to the invention is that, in contrast with the prior art, no aqueous phase-hydrocarbon phase emulsion occurs in the producing well during the revovery stage.

The product according to the invention has the further advantage of being used with a reduced amount of surfactant as compared with the amount required according to the prior art, due to the fact that the foam structure is maintained in the presence of a hydrocarbon phase.

Excellent results have been obtained with the following compound of general formula:

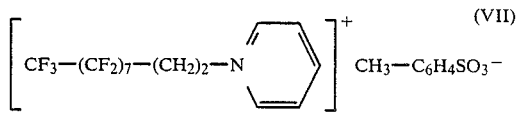

whose water/oil distribution coefficient is substantially zero and whose manufacture has been disclosed in French Pat. No. 1,588,482.

Very good results in enhanced oil recovery have been also obtained by using a foam containing a surfactant with perfluoric group prepared according to French Pat. No. 2,084,888 and complying with formula (VIII):

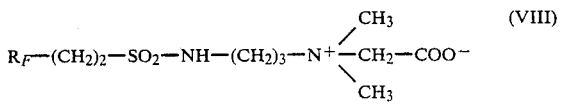

wherein $R_F$ is a perfluoric radical, preferably linear, containing in major part a mixture of radicals having 6, 8, 10, 12 perfluoric carbon atoms. The distribution coefficient of this product (VIII) is substantially 0.

A solution comprising a pure product with a well-defined chain $R_F$ (e.g. $C_6F_{13}$, $C_8F_{17}$) or mixtures of products having different $R_F$ chains (for example a mixture of compounds wherein $R_F$ corresponds in major proportion to 6, 8, 10 and 12 perfluoric carbon atoms) can be used.

The solutions of fluoric surfactants according to the invention are contacted with gases, advantageously incondensable gases such for example as air, carbon dioxide, nitrogen, methane, natural gas or mixtures thereof, particularly utility and combustion gases, discharged for example from steam generators.

Steam may also be used, preferably in the presence of incondensable gas.

The finally obtained foam may, after injection into the reservoir, block the gas access to previously flushed zones, either by gravity effect or as a result of the permeability difference, thus increasing the gas sweeping and resulting in an enhanced oil recovery.

The quality of a foam is defined as the ratio of the gas volume to the total volume of gas and liquid phase.

The quality satisfactory for the formation of a foam varies from 70% to 99.9%. Preferably a quality from 85% to 99% will be chosen.

The liquid phase is formed of an aqueous solution whose active product concentration may vary from 0.05% to 10% by weight, preferably from 0.5% to 2% by weight.

The injection on the field is performed through at least one injection well, generally at a pressure substantially lower than the fracturation pressure of the considered field. It may be achieved by pumping means, either in separate injections, first of a plug of surfactant, than of a plug of incondensable gas, these separate injections being optionally repeated, or by simultaneous injection of at least one plug of gas and surfactant solution, the foam being formed by contact of the products in the field.

According to a preferred embodiment, the first plug is formed of a foam mainly containing the fluoric surfactant according to the invention, the following plugs being optionally formed of non fluoric foams manufactured according to the prior art, in view of their advantageous technical cost.

The foam may also be prepared at the surface in a generator and then injected into the field.

When sweeping is performed with steam, a surfactant solution according to the invention is first injected, followed with either a simultaneous injection of steam and incondensable gas, or with successive injections of incondensable gas and of steam.

As a general rule, the gas included in the foam composition is not necessarily the same as that normally used during the hydrocarbon production.

The sweeping of at least a part of the reservoir by this foam leads to the production of hydrocarbons which are recovered through a producing well. This recovery is continued at least until at least one surfactant reaches the producing well.

BRIEF DESCRIPTION OF THE DRAWINGS

The invention will be better understood from the accompanying figures and photographs wherein.

EXAMPLES

The following examples are given to illustrate the invention but are not limiting of the scope thereof. For example the foam according to the invention can be used alone or as a mixture with foams of the prior art containing surfactants, but without perfluoric groups.

A first series of tests has been conducted at room temperature in pyrex cells in order to visually observe the action of the foam in prous medium and in the presence of a hydrocarbon phase. The second series is conducted in an equipment adapted to operate in hot conditions, in view to determine the efficiency of the considered surfactants in operating conditions corresponding to steam injection.

The use of a foam generator, although of easier use (providing a foam of constant and reproducible quality) is not absolutely necessary; the generated foam may travel within the porous medium even when the gas and surfactant constituents are separately injected therein, simultaneously or as alternate plugs.

EXAMPLE 1 (illustrating the prior art)

This experiment is performed at room temperature in a pyrex cell of 5 cm diameter and 38 cm length, filled with glass balls of 500 micron diameter, 100% saturated with a synthetic oil (viscosity = 1.7 mPa.s; density = 860 kg/m$^3$ at 20° C.).

(1a)-This cell is swept with nitrogen at a rate of 0.1 liter per hour.

Figure 1:
FIGS. 1, 2 and 3 show the travel of the foam front, in homogeneous porous medium, in the presence of sulfonates according to the prior art.

The formation of preferential paths is observed as well as a very quick gas release (FIG. 1), the oil recovery at this stage being low.

Figure 2:

After injection of a gas volume corresponding to about 100 times the pore volume, the oil recovery rate is about 50% and remains substantially unchanged (FIG. 2).

(1b)-This cell is then continuously fed with 105 ml/h of foam formed of nitrogen (0.1 liter/hour) and of surfactant solution (5 ml/hour).

The surfactant is of conventional type. It consists of a sodium benzene sulfonate used as 1% by weight aqueous solution.

Figure 3:
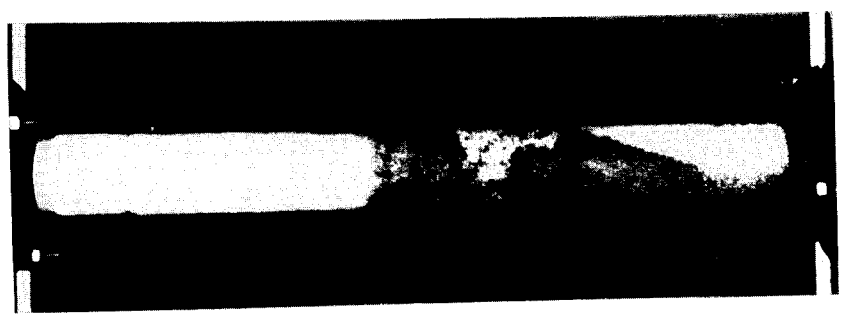

As clearly shown in FIG. 3, a mechanical degradation of the foam is observed. It is characterized by the presence of a more and more diffused front as the latter progresses towards the exit face of the porous medium.

On the other hand, the front is not clear and an intermediary zone is formed whose composition varies from foam itself to a water+surfactant/oil/gas mixture, the gas tending preferentially to flow in the upper part of the porous medium and the surfactant solution in the lower part.

The foam slowly progresses in a direction parallel to the preferential passage zone, as the hydrocarbon phase is removed from the concerned zones.

A substantially zero oil residual saturation is only achieved after about one hundred volumes of pores have been introduced.

EXAMPLE 2

Example 1 is repeated but the injection of a foam formed from a conventional surfactant solution as in (1b) of example 1, is replaced by the injection, in the same conditions, of a foam formed from a 1% aqueous solution of the surfactant defined by the above formula (VII).

This compound is obtained by anion exchange from (heptadecafluoro octyl-2 ethyl) pyridinium iodide as described in example 1 of French Pat. No. 1,588,482. This anion exchange may be achieved by treating the iodide with paratoluene sulfonic acid or with paratoluene methyl sulfonate.

The solubility in oil of said product is lower than the measurement limit of accuracy.

Figure 4:
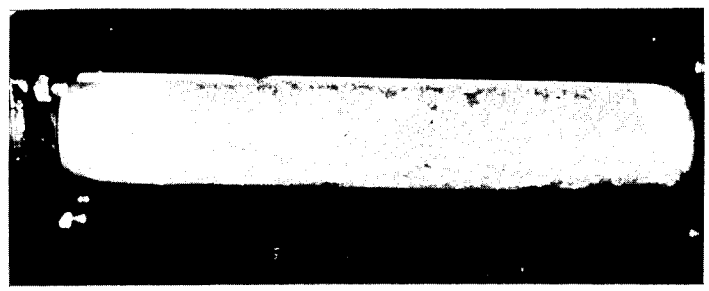
FIGS. 4, 5 and 6 show the corresponding travel of the foam front according to the invention.
Figure 5:
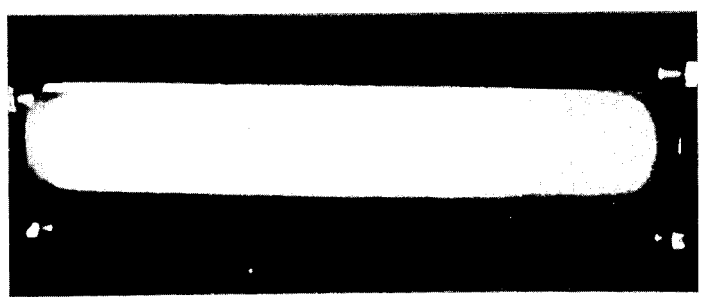

The formation of an oil bank pushed by a sharp and stable foam front, perpendicular to the axis of the porous medium (FIG. 4, 5) becomes apparent. This front, irrespective of the position of the porous medium (horizontal or vertical with injection from the top or from the bottom) regularly progresses.

Figure 6:

The oil residual saturation is substantially zero after the injection of a foam amount of about one pore volume. The recovery is hence close to 100% (FIG. 6).

EXAMPLE 3

A bi-strata porous medium is placed into a cell of the same size as in example 1. It is formed of two media of different permeabilities (glass balls of 500 and 250 microns) juxtaposed in the direction of the length and communicating with each other. The medium is impregnated with oil, as described in example 1.

Gas and foam are injected according to the prior art, as described in example 1. The foam begins to penetrate the more permeable medium, then flushes out the oil from the second medium, in a parallel direction and from the interface between the two layers, thus progressively penetrating zones wherefrom oil has been expelled. However this process is time-consuming.

After the test, the oil residual saturation is practically zero. However, as for an homogeneous medium, this result is obtained after injection of a foam amount of about one hundred volumes of pores.

EXAMPLE 4

The bi-strate porous medium of example 3 is again used with injection of the foam defined in example 2, formed from the surfactant of formula (VII) according to the invention.

Figure 7:
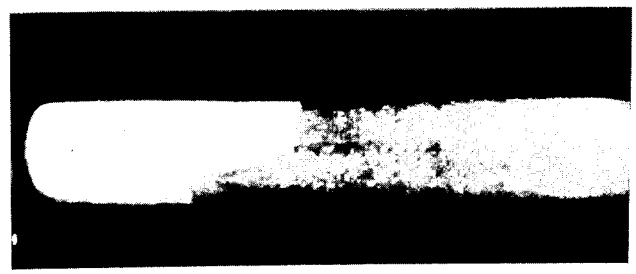
FIGS. 7, 8 and 9 illustrate the travel of the foam front in a bi-strata porous medium.

An oil bank appears which is pushed by a very sharp and stable foam front perpendicular to the axis of the one or more porous media (FIG. 7) moving simultaneously through both zones. The foam first begins to penetrate the more permeable area.

Figure 8:
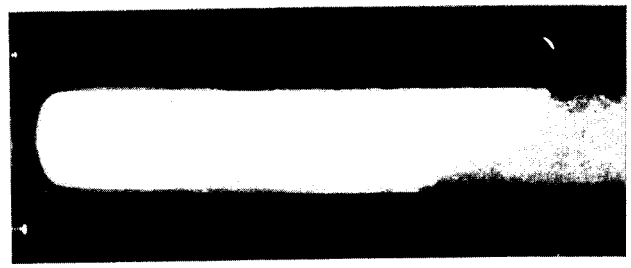

After a sufficient pressure drop has been reached in said layer, the sweeping begins in the less permeable part. The pressure distribution defines the lag of the second front with respect to the first one and the travel continues in balanced conditions (FIG. 8).

Figure 9:

At the end of the test about 100% of the oil were recovered. The whole porous medium was swept by a foam amount of about one volume of the pores (FIG. 9).

EXAMPLE 5

Example 2 is repeated except that the foam formed from the surfactant of formula (VII) is replaced, in the same conditions, by a foam performed as in example 2 and containing a surfactant as defined by the above formula (VIII) and prepared in accordance with French Pat. No. 2,084,888, wherein $R_F$ is a perfluoric radical containing in major part a mixture of radicals having 6, 8, 10 and 12 carbon atoms, used in the following respective proportions: 55%, 25%, 10% and 10% by number. The results are substantially identical to those of example 2.

EXAMPLE 6

Example 4 is repeated except that the foam formed from the surfactant of formula (VII) is replaced, in the same conditions, by a foam preformed as in example 4 and containing the same surfactant as in example 5. The results are substantially identical to those obtained in example 4.

EXAMPLE 7

Examples 2 and 4 have been repeated with products a, b, c, d and e, as defined below:

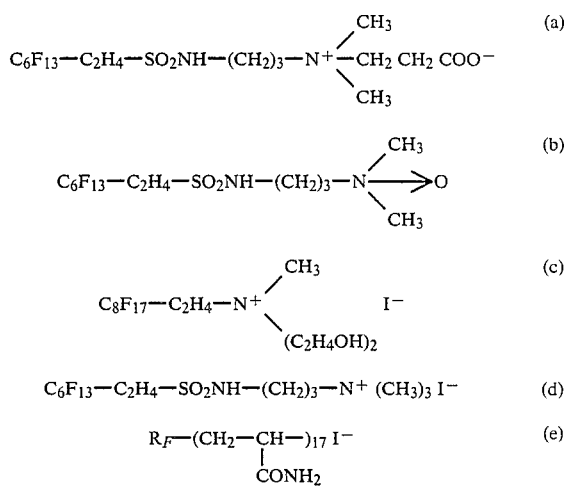

wherein $R_F$ is a mixture of perfluoric radicals essentially comprising $C_6F_{13}$, $C_8F_{17}$ and $C_{10}F_{21}$. This telomer e) has been disclosed in example 45 of European Pat. No. 189,698.

The results obtained with these products are substantially equivalent to those obtained in examples 2 and 4.

What is claimed as the invention is:

1. A process for enhanced recovery of hydrocarbons present in a subsurface reservoir comprising injecting through at least one injection well a plug of a solution of at least one surfactant and a gas, so as to form a foam, and wherein at least a part of said reservoir is swept by said foam and hydrocarbons are recovered from at least one producing well, wherein the surfactant has the formula (I)

wherein $R_F$ is a perfluoric carbon radical, Y is a divalent hydrocarbon radical or a divalent radical containing at least one oxygen, sulfur or nitrogen atom, and X is a hydrophilic group.

2. A process according to claim 1, wherein the perfluoric radical $R_F$ is a linear or branched perfluoroalkyl radical containing 1 to 20 carbon atoms.

3. A process according to claim 2, wherein $R_F$ contains 4–14 carbon atoms.

4. A process according to claim 1, wherein the surfactant has the formula (II):

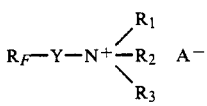

wherein
RF and Y are defined above and the remainder of the molecule corresponds to group X,
n is an integer from 1 to 12, each of symbols $R_1$, $R_2$ and $R_3$, (a) being identical or different, represents a hydrogen atom, an alkyl radical of 1-8 C carbon atoms, a cycloalkyl radical of 5-10 carbon atoms, an alkenyl radical of 2-8 carbon atoms, a cycloalkenyl radical of 5-10 carbon atoms, a hydroxyalkyl radical containing 2 or 3 carbon atoms or an aryl radical, (b) two of R, $R_2$ and $R_3$ form together a divalent radical linked with the nitrogen atom by two single bonds, or (c) $R_1$, $R_2$ and $R_3$ form, together with the nitrogen atom, an aromatic tertiary amine radical containing 5 to 18 carbon atoms; and
$A^-$ is an anion selected from the group consisting of a halide, a sulfate, an alkylsulfate, a phosphate, a sulfonate, an alkylsulfonate, an arylsulfonate, an alkanoate and a hydroxyl ion.

5. A process according to claim 4, wherein n is 2.

6. A process according to claim 1, wherein said surfactant has the formula (III):

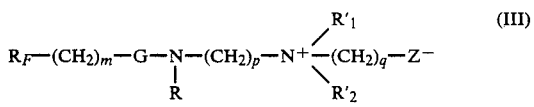

wherein:

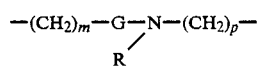

corresponds to radical Y of formula (I) and wherein:

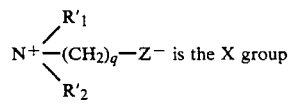 is the X group $R_F$ is a perfluoric group defined in formula (I),
m is zero or an integer from 1 to 12,
G is a divalent CO or $SO_2$ radical,
R is a hydrogen atom or an alkyl group of 1–4 carbon atoms,
p is zero or an integer from 1 to 10,
$R'_1$ and $R'_2$, are identical different, and are alkyl groups having 1 to 4 carbon atoms,
q is an integer from 1 to 20, and
Z is a sulfonate or carboxylate group.

7. A process according to claim 6, wherein m is 2.

8. A process according to claim 1, wherein said surfactant has the formula (IV):

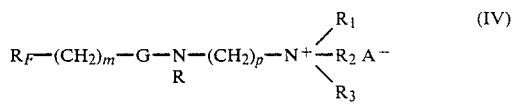

wherein m is zero or 1 to 12, G is a divalent CO or $SO_2$ radical, R is a hydrogen atom or an alkyl group of 1–4 carbon atoms, p is zero or 1 to 10, each of symbols $R_1$, $R_2$ and $R_3$, identical or different, represents a hydrogen atom, or an alkyl radical of 1–8 carbon atoms, a cycloalkyl radical of 5–10 carbon atoms, an alkenyl radical of 2–8 carbon atoms, a cycloalkenyl radical of 5–10 carbon atoms, a hydroxyalkyl radical containing 2 or 3 carbon atoms, or an aryl radical, (b) two of said symbols form together a divalent radical linked with the nitrogen atom by two single bonds, or (c) $R_1$, $R_2$ and $R_3$ form, together with the nitrogen atom, an aromatic tertiary amine radical containing 5 to 18 carbon atoms; and
$A^-$ is an anion selected from the group consisting of a halide, a sulfate, an alkylsulfate, a phosphate, a sulfonate, an alkylsulfonate, an arylsulfonate, an alkanoate and a hydroxyl ion.

9. A process according to claim 1, wherein said surfactant has the formula (V):

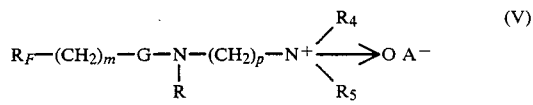

wherein m is zero or 1 to 12, G is a divalent CO or $SO_2$ radical, R is a hydrogen atom or an alkyl group of 1–4 carbon atoms, p is zero or 1 to 10, and $R_4$ and $R_5$ are alkyl radicals of 1–6 carbon atoms.

10. A process according to claim 1, wherein said surfactant has the formula (VI):

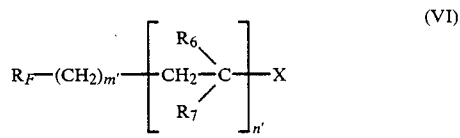

wherein:
X is a iodine, chlorine or bromine atom,
m' is zero, 1 or 2,
n' is a number from 5 to 1000,
$R_6$ is a hydrogen atom or a methyl radical,
$R_7$ is a —COOH or $CONR_8R_9$ group, each of symbols $R_8$ and $R_9$, are identical or different and are a hydrogen atom, an alkyl radical or a hydroxyalkyl radical.

11. A process according to claim 1, characterized in that the surfactant has the formula (VII):

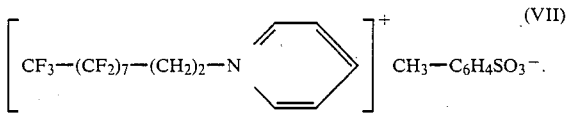

12. A process according to claim 1, wherein the surfactant has the formula (VIII):

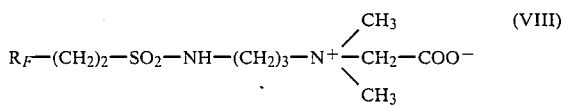

wherein $R_F$ is a perfluoric radical having 6, 8, 10 or 12 perfluoric carbon atoms.

13. A process according to claim 12, wherein the surfactant consists essentially of a mixture of surfactants of formula VIII.

14. A process according to claim 1, wherein, for a foam quality varying from 70% to 99.9% and preferably from 85 to 99%, the surfactant with perfluoric groups is present in an aqueous solution in a proportion varying from 0.05 to 10%, preferably from 0.5 to 2% by weight, and in that the gas used for the foam preparation is steam, air, nitrogen, utility gases, carbon dioxide, methane, natural gas or a mixture thereof.

15. A process according to claim 1, wherein the surfactant has the formula:

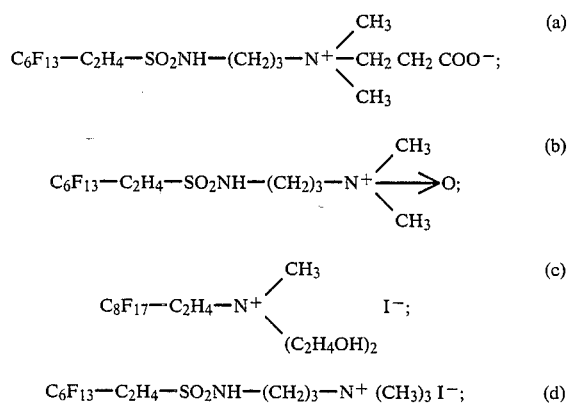

or

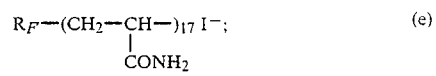

wherein $R_F$ is a mixture of perfluoric radicals comprising $C_6F_{13}$, $C_8F_{17}$ and $C_{10}F_{21}$.

16. A process according to claim 1, wherein the gas used for foam preparation is a mixture of steam and at least one of air, nitrogen, utility gases, carbon dioxide, methane or natural gas.

17. A process according to claim 1, wherein Y is a divalent radical containing carbon and at least one oxygen, nitrogen or sulfur atom.

18. A process for enhanced recovery of hydrocarbons present in a subsurface reservoir comprising injecting through at least one injection well of a plug of a solution of at least one surfactant and a gas, so as to form a foam, and wherein at least a part of said reservoir is swept by said foam and hydrocarbons are recovered from at least one producing well, wherein the surfactant has the formula

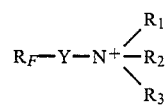

wherein $R_F$ is a perfluoric carbon radical, Y is a single bond or a divalent hydrocarbon radical or a divalent radical containing at least one oxygen, sulfur or nitrogen atom, and $R_1$, $R_2$ and $R_3$, (a) being identical or different, represents a hydrogen atom or an alkyl radical of 1-8 C carbon atoms, a cycloalkyl radical of 5-10 carbon atoms, an alkenyl radical of 2-8 carbon atoms, a cycloalkenyl radical of 5-10 carbon atoms, a hydroxyalkyl radical containing 2 or 3 carbon atoms or an aryl radical, (b) two of said symbols R, $R_2$ and $R_3$ optionally forming together a divalent radical linked with the nitrogen atom by two single bonds, or (c) $R_1$, $R_2$ and $R_3$ form, together with the nitrogen atom, the remainder of an aromatic tertiary amine derived from pyridine and radical containing 5 to 18 carbon atoms; and $A^-$ is an anion selected from the group consisting of a halide, a sulfate, an alkylsulfate, a phosphate, a sulfonate, an alkylsulfonate, an arylsulfonate, an alkanoate and a hydroxyl ions.

* * * * *